United States Patent
Kitora (10) Patent No.: US 10,408,710 B2
(45) Date of Patent: Sep. 10, 2019

(54) TIRE FAULT PORTION PREDICTION SYSTEM AND TIRE FAULT PORTION PREDICTION METHOD

(71) Applicant: BRIDGESTONE CORPORATION, Chuo-ku, Tokyo (JP)

(72) Inventor: Atsushi Kitora, Kodaira (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 15/531,319

(22) PCT Filed: Nov. 26, 2015

(86) PCT No.: PCT/JP2015/005876
§ 371 (c)(1),
(2) Date: May 26, 2017

(87) PCT Pub. No.: WO2016/084376
PCT Pub. Date: Jun. 2, 2016

(65) Prior Publication Data
US 2017/0343452 A1   Nov. 30, 2017

(30) Foreign Application Priority Data
Nov. 28, 2014 (JP) .................. 2014-241813

(51) Int. Cl.
*G01M 17/02* (2006.01)
*B60C 19/00* (2006.01)
*B60C 11/24* (2006.01)

(52) U.S. Cl.
CPC ............. *G01M 17/02* (2013.01); *B60C 11/24* (2013.01); *B60C 11/246* (2013.01); *B60C 19/00* (2013.01)

(58) Field of Classification Search
CPC ...... G01M 17/02; B60C 11/24; B60C 11/246; B60C 19/00
See application file for complete search history.

(56) References Cited

U.S. PATENT DOCUMENTS

| 5,809,437 A | 9/1998 | Breed |
| 2004/0071334 A1 | 4/2004 | Hassler et al. |

(Continued)

FOREIGN PATENT DOCUMENTS

| CN | 102460099 A | 5/2012 |
| CN | 103534583 A | 1/2014 |

(Continued)

OTHER PUBLICATIONS

Oct. 20, 2017, Search Result of the Extended European Search Report issued by the European Patent Office in the corresponding European Patent Application No. 15862495.7.

(Continued)

*Primary Examiner* — Thomas Ingram
(74) *Attorney, Agent, or Firm* — Kenja IP Law PC (57) ABSTRACT

The tire fault portion prediction system of this disclosure comprises: a tire running parameter measurement unit, a state characteristic value measurement unit, a degree of fatigue characteristic value calculation unit, and a tire fault portion prediction unit for predicting fault portions of a tire based on a degree of fatigue characteristic value of at least one of the tire constituent members and the tire running parameter. The tire fault portion prediction method of this disclosure comprises: measuring a tire running parameter, measuring state characteristic values, calculating degree of fatigue characteristic values, and predicting fault portions of a tire based on a degree of fatigue characteristic value of at least one of the tire constituent members and the tire running parameter.

16 Claims, 5 Drawing Sheets

(56) References Cited

U.S. PATENT DOCUMENTS

| | | |
|---|---|---|
| 2004/0267416 A1 | 12/2004 | Ishikawa et al. |
| 2005/0286046 A1 | 12/2005 | Hassler et al. |
| 2008/0278306 A1 | 11/2008 | Uehara et al. |
| 2012/0101746 A1 | 4/2012 | Taylor et al. |
| 2013/0131915 A1 | 5/2013 | Masago |
| 2014/0067193 A1 | 3/2014 | Gokyu et al. |
| 2014/0086453 A1 | 3/2014 | Imada et al. |
| 2014/0311232 A1 | 10/2014 | Kanenari et al. |

FOREIGN PATENT DOCUMENTS

| | | |
|---|---|---|
| CN | 103946040 A | 7/2014 |
| EP | 2703194 A1 | 3/2014 |
| JP | 2001074614 A | 3/2001 |
| JP | 2005029144 A | 2/2005 |
| JP | 2005047295 A | 2/2005 |
| JP | 2005104205 A | 4/2005 |
| JP | 2005337929 A | 12/2005 |
| JP | 2006010378 A | 1/2006 |
| JP | 2007269303 A | 10/2007 |
| JP | 2012006472 A | 1/2012 |
| JP | 5231673 B1 | 7/2013 |
| JP | 2014046879 A | 3/2014 |
| JP | 2014051889 A | 3/2014 |
| JP | 2014137269 A | 7/2014 |
| WO | 0248670 A2 | 6/2002 |
| WO | 0248670 A3 | 9/2002 |

OTHER PUBLICATIONS

Nov. 13, 2018, search result of Office Action issued by the State Intellectual Property Office in the corresponding Chinese Patent Application No. 201580074273.3.

TIRE FAULT PORTION PREDICTION SYSTEM AND TIRE FAULT PORTION PREDICTION METHOD

TECHNICAL FIELD

This disclosure relates to a tire fault portion prediction system and a tire fault portion prediction method.

BACKGROUND

Conventionally, for management of tires, a management method via TKPH was applied (see PTL 1). This method performs running adjustment within a range of the product of permitted load and permitted speed, and performs management such as varying conditions of use of tires, replacing tires among vehicles and the like based on this.

CITATION LIST

Patent Literature
PTL1 JP2007269303A

SUMMARY

Technical Problem

Here, when predicting tire fault portions, use of the aforementioned TKPH may be considered as well. However, with this method, since the permitted load and the permitted speed do not completely correspond to the tire temperature, and tire fault portions are different depending on the running route, it is difficult to correctly predict the tire fault portions.

Then, this disclosure is to provide a tire fault portion prediction system and a tire fault portion prediction method capable of correctly predicting tire fault portions.

Solution to Problem

The subject of this disclosure is as follows.

The tire fault portion prediction system of this disclosure comprises: a tire running parameter measurement unit for measuring a tire running parameter, a state characteristic value measurement unit for measuring state characteristic values showing a state of tire constituent members, a degree of fatigue characteristic value calculation unit for calculating degree of fatigue characteristic values corresponding to degrees of fatigue of the tire constituent members based on the state characteristic values measured with the state characteristic value measurement unit, and a tire fault portion prediction unit for predicting fault portions of a tire based on a degree of fatigue characteristic value of at least one of the tire constituent members calculated with the degree of fatigue characteristic value calculation unit and the tire running parameter measured with the tire running parameter measurement unit.

Here, "measuring" refers to obtaining a tire running parameter or state characteristic values either directly or indirectly, and is inclusive of the case of obtaining a tire running parameter or state characteristic values by performing some calculation with respect to directly measured parameters, etc.

The tire fault portion prediction method of this disclosure comprises: measuring a tire running parameter with a tire running parameter measurement unit, measuring state characteristic values showing a state of tire constituent members with a state characteristic value measurement unit, calculating degree of fatigue characteristic values corresponding to degrees of fatigue of the tire constituent members based on state characteristic values measured with the state characteristic value measurement unit, with a degree of fatigue characteristic value calculation unit, and predicting fault portions of a tire based on a degree of fatigue characteristic value of at least one of the tire constituent members calculated with the degree of fatigue characteristic value calculation unit and the tire running parameter measured with the tire running parameter measurement unit, with a tire fault portion prediction unit.

Advantageous Effect

According to this disclosure, it is possible to provide a tire fault portion prediction system and a tire fault portion prediction method capable of correctly predict tire fault portions.

BRIEF DESCRIPTION OF THE DRAWINGS

In the accompanying drawings.

DETAILED DESCRIPTION

Hereinafter, the tire fault portion prediction system and the tire fault portion prediction method according to an embodiment of this disclosure is exemplified and described in details, by referring to the drawings.

<Tire Fault Portion Prediction System>

Figure 1:
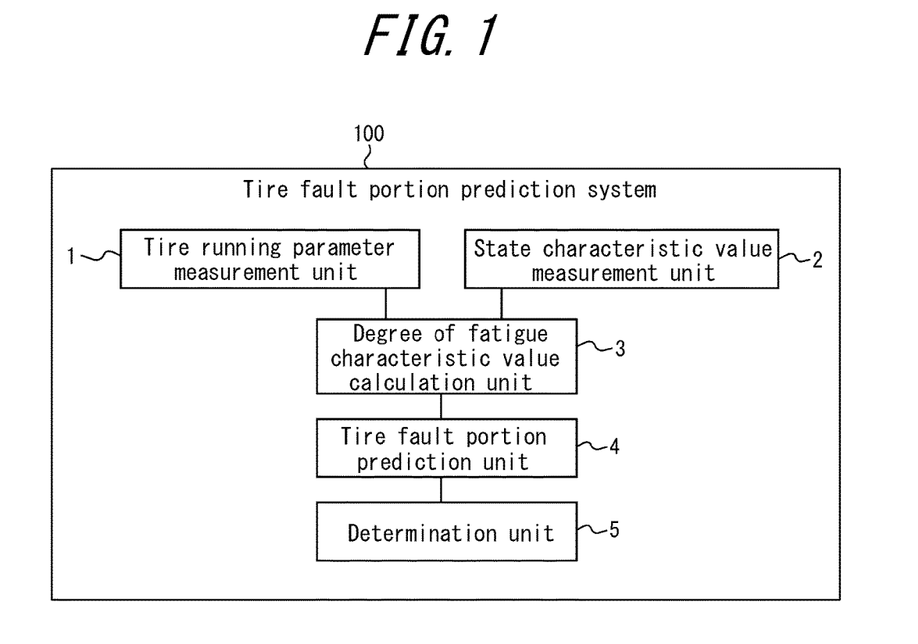
FIG. 1 illustrates functional blocks of the tire fault portion prediction system according to an embodiment of this disclosure.

FIG. 1 illustrates functional blocks of the tire fault portion prediction system 100 according to an embodiment of this disclosure.

As illustrated in FIG. 1, the tire fault portion prediction system 100 of the present embodiment includes the tire running parameter measurement unit 1, the state characteristic value measurement unit 2, the degree of fatigue characteristic value calculation unit 3, the tire fault portion prediction unit 4, and the determination unit 5.

Here, the tire running parameter measurement unit 1 is for measuring the tire running parameter. The tire running parameter may be, e.g., running time, running distance (using, e.g., records of GPS), RTD (remaining groove depth), tire rotation number, etc of the tire. Preferably, the tire running parameter is the running time or the running distance of the tire. The tire running parameter measurement unit 1 is exemplified as a known one capable of measuring the time and/or the distance the tire has run for, etc., by sensing the rotation of the tire.

The state characteristic value measurement unit 2 is for measuring the state characteristic values for showing the state of the tire constituent members. The tire constituent members are exemplified as bead, carcass, belt, tread rubber, etc. Moreover, the state characteristic values for showing the state of the tire constituent members are specifically exemplified as temperatures of the tire constituent members.

Figure 2:
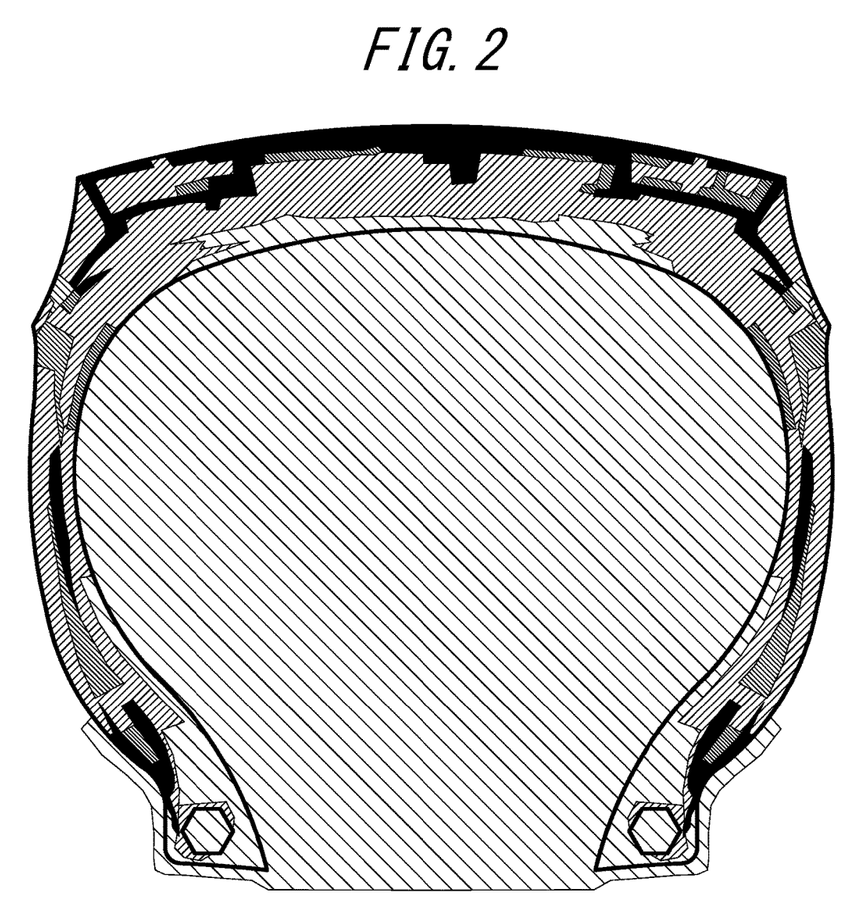
FIG. 2 illustrates a schematic view of the heat distribution of each constituent member of the tire.

Here, FIG. 2 illustrates a schematic view of the heat distribution of each constituent member of the tire. In FIG. 2, a higher density of shaded lines shows a higher temperature. As shown in FIG. 2, ordinarily, the temperature of the tire after running is different in each constituent member.

The temperatures of the tire constituent members may be calculated by, e.g., installing the state characteristic value measurement unit 2 inside a chamber (a space between the tire inner surface and the rim wheel), measuring the temperature inside the chamber, and converting to the temperatures of each tire constituent member therefrom.

For example, it is possible to use a predetermined formula to convert the temperature inside the chamber to the temperatures of each tire constituent member (tread, belt, bead, etc.). When Tch is the measured temperature inside the chamber, and $\alpha, \beta, \gamma, \delta$ are coefficients, as an example, the temperature T of a certain constituent member (tread, belt, bead, etc.) may be calculated by using the a formula:

$$T=\alpha \times (Tch \times \beta + \gamma)^{1/2} + \delta$$

Here, the coefficients $\alpha, \beta, \gamma, \delta$ are determined previously, e.g., by performing fitting based on previous data, etc., and thereby determining coefficients $\alpha, \beta, \gamma, \delta$ such that the error becomes minimum. Certainly, the coefficients $\alpha, \gamma, \gamma, \delta$ may be different for different constituent members.

Alternatively, the temperatures of tread, belt, bead, etc. may be calculated by adding a certain constant based on previous data, etc. to the measured temperature inside the chamber.

The degree of fatigue characteristic value calculation unit 3 is for calculating the degree of fatigue characteristic values corresponding to the degrees of fatigue of the tire constituent members, based on the state characteristic values measured with the state characteristic value measurement unit 2. In the present embodiment, the degree of fatigue characteristic value calculation unit 3 calculates the thermal history as the degree of fatigue characteristic value, by integrating the temperature measured with the state characteristic value measurement unit 2 with respect to the tire running time. Here, the thermal history is used as the degrees of fatigue characteristic value corresponding to the degrees of fatigue of the tire constituent members, because that the thermal history is an excellent indicator when predicting the fault risk of the tire constituent members.

The tire fault portion prediction unit 4 is for predicting the fault portions of the tire based on the degree of fatigue characteristic value (the thermal history in the present embodiment) of at least one of the tire constituent members calculated with the degree of fatigue characteristic value calculation unit 3 and the tire running parameter (the running time in the present embodiment) measured with the tire running parameter measurement unit 1.

Figure 3:
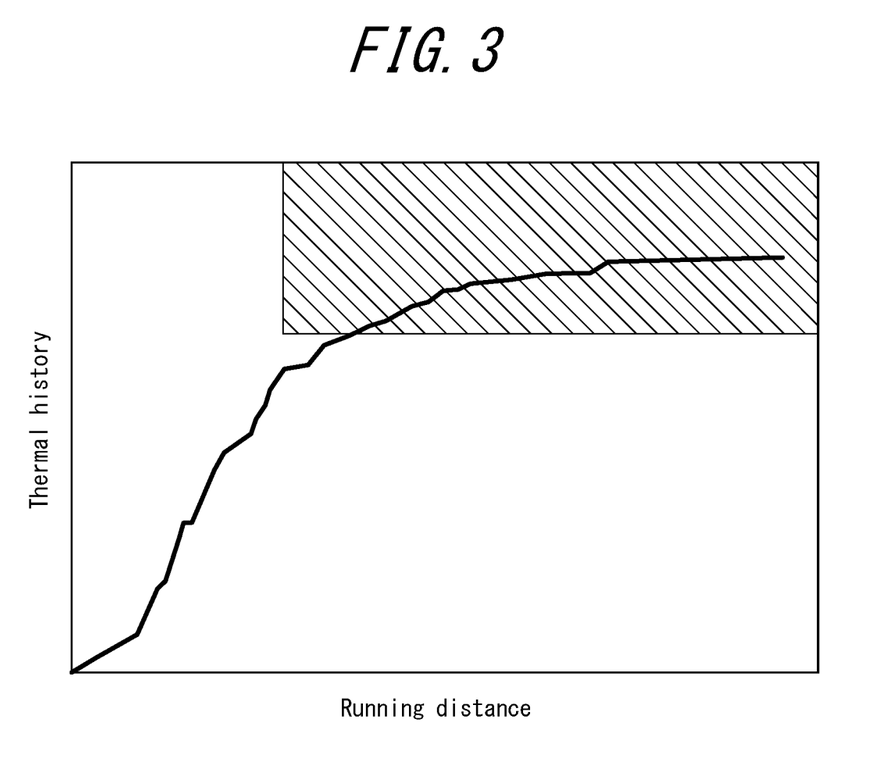
FIG. 3 illustrates the correlation between the running distance and the thermal history of the tire and the fault occurrence risk of the belt.

FIG. 3 illustrates the correlation between the running distance and the thermal history of the tire and the fault occurrence risk of the belt. As illustrated in FIG. 3, as the tire running distance increases, the thermal history of the belt increases as well. Then, in a region in which the tire running distance and the thermal history is no less than a certain value (the region marked with shaded lines in FIG. 3), the risk of fault occurrence of the belt is increased.

In this way, the fault risk of the tire constituent members such as tread, belt, bead and the like can be determined with the running time and the thermal history of the tire.

The same goes with the other tire running parameters such as the running distance (using, e.g., records of GPS), RTD (remaining groove depth), tire rotation number and the like, and the other degree of fatigue characteristic values.

Figure 4:
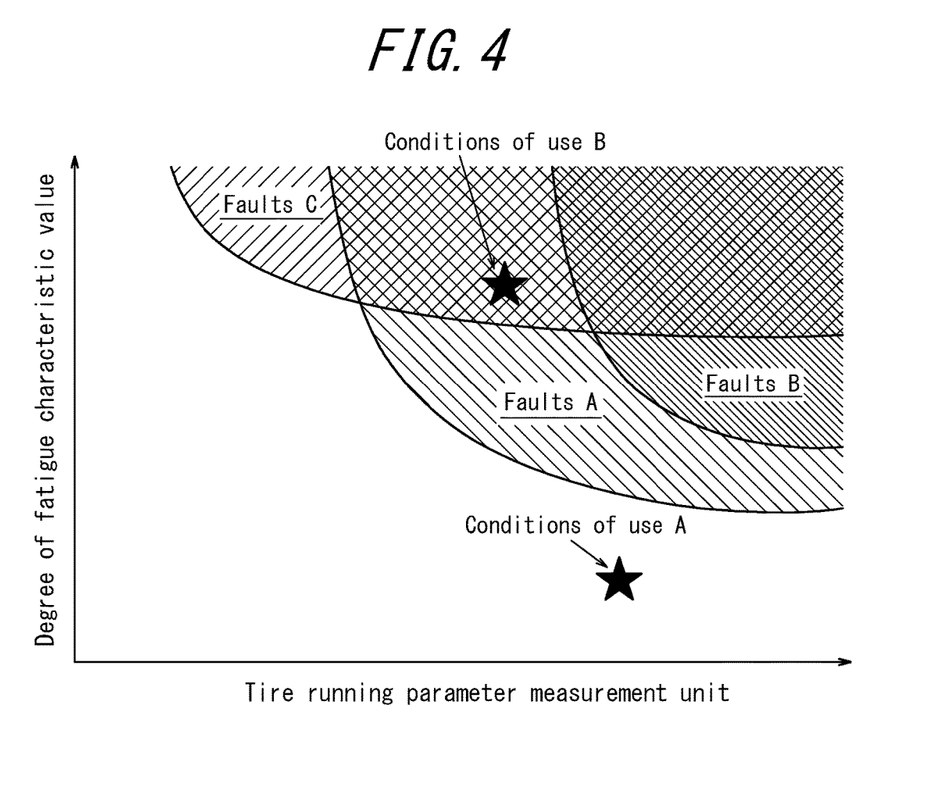
FIG. 4 illustrates the correlation between the running parameter and the degree of fatigue characteristic value, and the fault portions of the tire.

FIG. 4 illustrates the correlation between the running parameter and the thermal history, and the fault portions and the tire life of the tire. As illustrated in FIG. 4, in the present embodiment, the tire fault portion prediction unit 4 predicts the fault portions of the tire based on information obtained by relating the fault portions of the tire with two parameters, i.e., the degree of fatigue characteristic values (thermal history) and the tire running parameter (running time), the information using a coordinate system (an orthogonal coordinate system in this example) in which two axes are the two parameters.

Namely, the example as illustrated in FIG. 4 shows as such information the conditions (regions) for the fault risk of three tire portions A, B, C (e.g., belt, carcass and bead) to become a certain degree. This information can be previously prepared based on data relating to previous faults, etc.

The tire fault portion prediction system of the present embodiment has a memory unit, and such information may be stored in the memory unit, or obtained from the outside.

Then, it is possible to predict the tire fault portions by using the actually calculated degree of fatigue characteristic values (the thermal history in the present embodiment) and the actually measured tire running parameter (the running time in the present embodiment), and the aforementioned information.

In the example as illustrated in FIG. 4, in the case where the actual conditions of use at the timing of prediction are the conditions of use A, the calculated thermal history and the measured running parameters do not correspond to faults of any one of the tire portions A, B and C, and thus it is predicted that the fault risk has not reached a certain degree. On the other hand, in the case where the actual conditions of use at the timing of prediction are the conditions of use B, depending on the calculated thermal history and the measured running parameters, it is predicted that the fault risk of the faults of the tire portion A (faults A) or the faults of the tire portion C (faults C) reaches a certain degree.

Since each tire constituent member has different fault risk depending on the degree of fatigue and the running parameter, and depending on its parts, according to the tire fault portion prediction system 100 of the present embodiment, the prediction is performed by using the degree of fatigue characteristic values calculated based on the state characteristic values, and the tire running parameter, and thus it is possible to predict the portions of the fault risk.

Therefore, according to the tire fault portion prediction system 100 of the present embodiment, it is possible to correctly predict the tire fault portions.

Here, in the present embodiment, the determination unit 5 is for determining the type of tire optimum for the user, by using the prediction results according to the tire fault portion prediction unit 4. Namely, in specific types of tire, at specific conditions of use, in the case where it is predicted by the tire fault portion prediction unit 4 that, e.g., the possibility of faults of the bead portion is high, the determination unit 5 is capable of determining to provide to the user from the next time a type of tire excellent in the durability of the bead portion by using this prediction result, and showing this determination result with a display unit, etc. Based on this determination result, the user may replace the tire with a new tire excellent in the durability of the bead portion, or use a tire excellent in the durability of the bead portion via replacement of tire among vehicles.

Alternatively, in another embodiment, the determination unit 5 is capable of determining the conditions of use of the tire optimum for the user, by using the prediction results according to the tire fault portion prediction unit 4. Namely, at specific timing, e.g., in the case that a high possibility of belt faults is predicted, by using this prediction result, the determination unit 5 is capable of determining the conditions of use such that the risk of belt faults is reduced after this timing, and showing this determination result with a display unit, etc. Such conditions of use may be previously stored in a memory unit of the system, or obtained from the outside via communication, etc.

Certainly, the determination unit 5 may determine both the type of tire and the conditions of use of the tire optimum for the user, by using the prediction results of the tire fault portion prediction unit 4.

In this disclosure, the tire fault portion prediction system may have a communication portion. Further, the information of predicted faults may be transferred inside the vehicle or to an outside system with the communication unit.

In this case, the communication unit may be configured so as to receive from a system outside the information obtained by relating the fault portions of the tire with two parameters, i.e., the degree of fatigue characteristic values (e.g., thermal history) and the tire running parameter (e.g., running time), the information using a coordinate system (an orthogonal coordinate system in this example) in which two axes are the two parameters.

Alternatively, the tire fault portion prediction system may be configured so as to have a memory unit, so as to store the information of predicted faults in the memory unit and take out the same from the memory unit.

Moreover, the tire fault portion prediction system may be configured so as to have a display unit, and the predicted fault information can be certified by looking at its display.

Here, as mentioned above, in the tire fault portion prediction system of this disclosure, it is preferable that the tire fault portion prediction unit 4 predicts the fault portions of the tire by using the information obtained by relating the fault portions of the tire with two parameters, i.e., the degree of fatigue characteristic values and the tire running parameter, the information using a coordinate system in which two axes are the two parameters. This is because that it becomes easy to predict the tire fault portions.

In the tire fault portion prediction system of this disclosure, the aforementioned state characteristic value is preferably a temperature. This is because that by using as a standard the temperature, which is the direct principle reason for the faults of the tire constituent members, it is possible to predict the tire fault portions more correctly.

Further, in the tire fault portion prediction system of this disclosure, the aforementioned tire running parameter is preferably a running time. This is because that by using as a standard the running time, which is the direct principle reason for the faults of the tire constituent members, it is possible to predict the tire fault portions more correctly.

In the tire fault portion prediction system of this disclosure, the degree of fatigue characteristic value is preferably a thermal history obtained by integrating the temperature of a tire constituent member with respect to the running time. This is because that the thermal history is an excellent indicator for the faults of the tire constituent members, and thus it is possible to predict the tire fault portions more correctly.

In the tire fault portion prediction system of this disclosure, the tire constituent members of which the state characteristic values are measured preferably include at least a belt and a bead. This is because that it is possible to obtain the effect of this disclosure with respect to the belt and the bead, in which faults are likely to occur.

<Tire Fault Portion Prediction Method>

The tire fault portion prediction method of this disclosure can be preferably performed by using the aforementioned tire fault portion prediction system of this disclosure.

Figure 5:
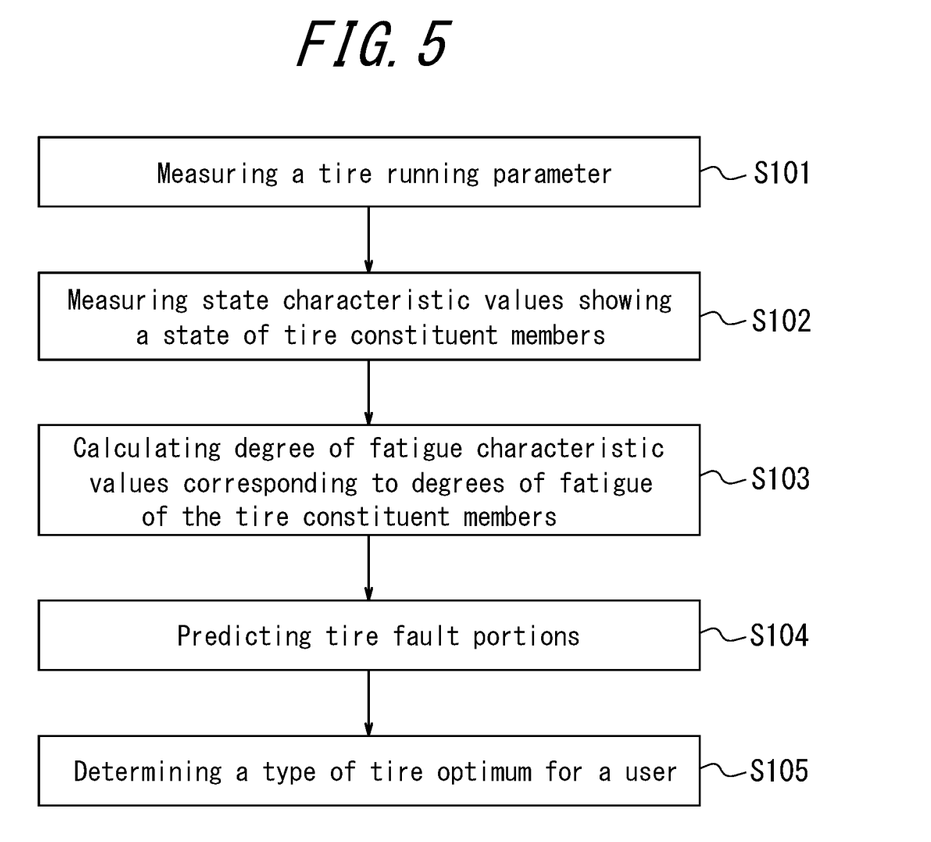
FIG. 5 illustrates a flow chart of the tire fault portion prediction method according to an embodiment of this disclosure.

FIG. 3 is a flow chart of the tire fault portion prediction method according to an embodiment of this disclosure.

As illustrated in FIG. 3, the tire fault portion prediction method of this disclosure comprises: measuring a tire running parameter with a tire running parameter measurement unit (step S101), measuring state characteristic values showing a state of tire constituent members with a state characteristic value measurement unit (step S102), calculating degree of fatigue characteristic values of the tire constituent members based on state characteristic values measured with the state characteristic value measurement unit, with a degree of fatigue characteristic value calculation unit (step S103), predicting fault portions of a tire based on a degree of fatigue characteristic value of at least one of the tire constituent members calculated with the degree of fatigue characteristic value calculation unit and the tire running parameter measured with the tire running parameter measurement unit, with a tire fault portion prediction unit (step S104), and determining a type of tire optimum for a user by using prediction results according to the tire fault portion prediction unit, with a determination unit (step S105).

Here, the tire fault portion prediction method of the present embodiment can be preferably performed by using the tire fault portion prediction system 100 according to the aforementioned embodiment, and the tire running parameter measurement unit 1, the state characteristic value measurement unit 2, the degree of fatigue characteristic value calculation unit 3, the tire fault portion prediction unit 4 and the determination unit 5 may be set as the aforementioned functional blocks as illustrated in FIG. 1.

Since each tire constituent member has different fault risk depending on the degree of fatigue and the running parameter, and depending on its parts, according to the tire fault portion prediction method of the present embodiment, the prediction is performed by using the degree of fatigue characteristic values calculated based on the state characteristic values, and the tire running parameter, and thus it is possible to predict the portions of the fault risk.

Therefore, according to the tire fault portion prediction method of the present embodiment, it is possible to correctly predict the tire fault portions.

As mentioned above, by determining the type of tire optimum for the user with the determination unit 5 by using the prediction results according to the tire fault portion prediction unit, it is possible to determine to provide to the user from the next time a type of tire excellent in the durability of a specific tire constituent member, and to show this determination result with a display unit, etc. Alternatively, in another embodiment, by determining the conditions of use of the tire optimum for the user with the determination unit 5, by using the prediction results according to the tire fault portion prediction unit 4, it is possible to determine the conditions of use such that the fault risk of a specific tire constituent member is reduced, and to show this determination result to a display unit, etc. Certainly, it is possible determine both the type of tire and the conditions of use of the tire optimum for the user.

Here, as mentioned above, in the tire fault portion prediction method of this disclosure, it is preferable that the tire fault portion prediction unit 4 predicts the fault portions of the tire by using information obtained by relating the fault portions of the tire with two parameters, i.e., the degree of fatigue characteristic values and the tire running parameter, the information using a coordinate system in which two axes are the two parameters. This is because that it becomes easy to predict the tire fault portions.

In the tire fault portion prediction method of this disclosure, the aforementioned state characteristic value is preferably a temperature. This is because that by using as a standard the temperature, which is the direct principle reason for the faults of the tire constituent members, it is possible to predict the tire fault portions more correctly.

Further, in the tire fault portion prediction method of this disclosure, the aforementioned tire running parameter is preferably a running time. This is because that by using as a standard the running time, which is the direct principle reason for the faults of the tire constituent members, it is possible to predict the tire fault portions more correctly.

In the tire fault portion prediction method of this disclosure, the degree of fatigue characteristic value is preferably a thermal history obtained by integrating the temperature of a tire constituent member with respect to the running time. This is because that the thermal history is an excellent indicator for the faults of the tire constituent members, and thus it is possible to predict the tire fault portions more correctly.

In the tire fault portion prediction method of this disclosure, the tire constituent members of which the state characteristic values are measured preferably include at least a belt and a bead. This is because that it is possible to obtain the effect of this disclosure with respect to the belt and the bead, in which faults are likely to occur.

An embodiment of this disclosure is described according to the above, while the tire fault portion prediction system and the tire fault portion prediction method of this disclosure are not limited to the embodiment of the aforementioned by any means. For example, in the embodiment as illustrated in FIG. 1, the tire running parameter measurement unit 1 and the state characteristic value measurement unit 2 are set as separate functional units, while it is possible to set them as a single functional unit in the tire fault portion prediction system of this disclosure. In this case, the tire fault portion prediction system may have, for example, a functional unit for measuring the temperature at a constant running time interval. Correspondingly, it is possible to simultaneously measure the tire running parameter (step S101) and measure the state characteristic values showing a state of tire constituent members (step S102), or alternatively, to measure the state characteristic values showing states of tire constituent members (step S102) before measuring the tire running parameter (step S101). Other various variations may be performed as well.

REFERENCE SIGNS LIST 1 tire running parameter measurement unit
2 state characteristic value measurement unit
3 degree of fatigue characteristic value calculation unit
4 tire fault portion prediction unit
5 determination unit
100 tire fault portion prediction system

The invention claimed is:

1. A tire fault portion prediction system comprising:
   a tire running parameter measurement unit for measuring a tire running parameter,
   a temperature measurement unit for measuring temperatures of tire constituent members, and
   a degree of fatigue characteristic value calculation unit for calculating degree of fatigue characteristic values corresponding to degrees of fatigue of the tire constituent members based on the temperatures measured with the temperature measurement unit, and
   predict fault portions of a tire based on at least one of the fatigue characteristic values and the tire running parameter.

2. The tire fault portion prediction system according to claim 1, further comprising a memory unit storing information obtained by relating the fault portions of the tire with the fatigue characteristic values and the tire running parameter.

3. The tire fault portion prediction system according to claim 2, wherein: the information stored in the memory unit uses a coordinate system in which two axes are the two parameters.

4. The tire fault portion prediction system according to claim 2, wherein: one fault portion or a plurality of fault portions are predicted based on the information stored in the memory unit.

5. The tire fault portion prediction system according to claim 2, wherein: one fault portion or a plurality of fault portions are predicted based on the information stored in the memory unit.

6. The tire fault portion prediction system according to claim 2, the fatigue characteristic value is a thermal history obtained by integrating a temperature of the tire constituent member with respect to a running time.

7. The tire fault portion prediction system according to claim 2, wherein:
   one fault portion or a plurality of fault portions are predicted based on the information stored in the memory unit; and
   the fatigue characteristic value is a thermal history obtained by integrating a temperature of the tire constituent member with respect to a running time.

8. The tire fault portion prediction system according to claim 2, wherein:
   one fault portion or a plurality of fault portions are predicted based on the information stored in the memory unit; and
   a type of tire for a user is determined by using the predicted fault portions.

9. The tire fault portion prediction system according to claim 2, wherein:
   one fault portion or a plurality of fault portions are predicted based on the information stored in the memory unit; and
   conditions of use of a tire for a user are determined by using the predicted fault portions.

10. The tire fault portion prediction system according to claim 1, wherein: the fatigue characteristic value is a thermal history obtained by integrating a temperature of the tire constituent member with respect to a running time.

11. The tire fault portion prediction system according to claim 1, wherein:
    the fatigue characteristic value is a thermal history obtained by integrating a temperature of the tire constituent member with respect to a running time; and
    a type of tire for a user is determined by using the predicted fault portions.

12. The tire fault portion prediction system according to claim 1, wherein:
    the fatigue characteristic value is a thermal history obtained by integrating a temperature of the tire constituent member with respect to a running time; and conditions of use of a tire for a user are determined by using the predicted fault portions.

13. A tire fault portion prediction method comprising:

measuring a tire running parameter with a tire running parameter measurement unit, measuring temperatures of tire constituent members with a temperature measurement unit, calculating fatigue characteristic values corresponding to degrees of fatigues of the tire constituent members based on the temperatures measured with the temperature measurement unit, predicting fault portions of a tire based on at least one of the fatigue characteristic values and the tire running parameter, and showing the predicted fault portions with a display unit.

14. The tire fault portion prediction method according to claim 13, further comprising: determining a type of tire for a user with the processor, by using the predicted fault portions, and showing the determined type of tire with the display unit.

15. The tire fault portion prediction method according to claim 14, further comprising: determining conditions of use of a tire for a user by using the predicted fault portions, and showing the determined condition of use with the display unit.

16. The tire fault portion prediction method according to claim 13, further comprising: determining conditions of use of a tire for a user by the predicted fault portions, and showing the determined condition of use with the display unit.

\* \* \* \* \*